US006946621B1

(12) United States Patent
Roseman

(10) Patent No.: US 6,946,621 B1
(45) Date of Patent: Sep. 20, 2005

(54) AUTOMOTIVE SAFETY DEVICE FOR MELTING SNOW AND ICE FROM ROADWAYS

(76) Inventor: David M. Roseman, 1424 Academy La., Elkins Park, PA (US) 19027

( * ) Notice: Subject to any disclaimer, the term of this patent is extended or adjusted under 35 U.S.C. 154(b) by 0 days.

(21) Appl. No.: 10/905,939

(22) Filed: Feb. 10, 2005

(51) Int. Cl.[7] .................................................. B60L 1/02
(52) U.S. Cl. ....................................... 219/202; 219/203
(58) Field of Search ................................ 219/202, 205, 219/528; 392/307, 375, 376, 379; 237/12.3; 180/271, 280; 280/855

(56) References Cited

U.S. PATENT DOCUMENTS

| 2,325,901 | A | * | 8/1943 | Atkinson | 180/271 |
|---|---|---|---|---|---|
| 2,787,694 | A | * | 4/1957 | Farries | 219/202 |
| 2,992,317 | A | * | 7/1961 | Hoffman | 219/202 |
| 3,264,450 | A | * | 8/1966 | Wallace | 392/307 |
| 4,063,606 | A | | 12/1977 | Makinson | |
| 4,188,527 | A | * | 2/1980 | Follmer | 219/202 |
| 4,203,423 | A | | 5/1980 | Ricci | |
| 4,293,759 | A | * | 10/1981 | Higgins | 219/202 |
| 4,324,307 | A | | 4/1982 | Schittino et al. | |
| 4,848,510 | A | | 7/1989 | Ahmed | |
| 5,025,130 | A | * | 6/1991 | Slone | 219/203 |
| 5,206,476 | A | * | 4/1993 | Fresch et al. | 219/202 |
| 5,222,661 | A | * | 6/1993 | Wenhart | 236/49.3 |
| 5,279,459 | A | * | 1/1994 | Single, II | 237/2 A |
| 5,399,838 | A | * | 3/1995 | Brown | 219/202 |
| 5,573,686 | A | * | 11/1996 | Lavicska | 219/202 |
| 5,831,244 | A | * | 11/1998 | Springer, Jr. | 219/203 |
| 5,897,802 | A | * | 4/1999 | Jones | 219/202 |
| 6,002,105 | A | * | 12/1999 | Tamada | 219/202 |
| 6,021,843 | A | | 2/2000 | Roach | |
| 6,140,609 | A | * | 10/2000 | Jones | 219/202 |
| 6,488,217 | B1 | | 12/2002 | Donastorg | |
| 6,848,726 | B1 | * | 2/2005 | Horsham | 291/3 |

* cited by examiner

Primary Examiner—Robin O. Evans
Assistant Examiner—Vinod Patel

(57) ABSTRACT

An automotive vehicle safety device for melting ice and snow on roadways and in areas immediately adjacent the vehicle tires includes ductwork extending from a heater mounted adjacent the vehicle engine with the ductwork terminating at front and rear undercarriage mounted v-shaped ducts. Each v-shaped duct includes a pair of heating vents disposed adjacent each vehicle tire that blows heated air onto the roadway for melting the ice and snow. A heating grid is securable to the vehicle undercarriage for providing additional radiant heat to melt ice and snow, and a dashboard-mounted control panel provides for the manual activation of the heater and the heating grid while sensors mounted to the undercarriage and electrically connected to the control panel provide for automatic activation of the heater and heating grid upon sensing a predetermined temperature.

11 Claims, 4 Drawing Sheets

AUTOMOTIVE SAFETY DEVICE FOR MELTING SNOW AND ICE FROM ROADWAYS

FIELD OF THE INVENTION

The present invention pertains to automotive vehicle safety equipment, and more particularly pertains for a system that heats and melts snow and ice adjacent the vehicle wheels for improving vehicle traction and safety.

BACKGROUND OF THE INVENTION

In rainy, snowy, and icy weather conditions, the steady accumulation of water, ice, and falling snow upon the roadway surface is a very great automotive vehicle and occupant hazard. Such accumulations will cause the vehicle wheels to slide on the roadway surface during breaking, turning, coming into and leaving curves, and even, at times, during normal driving. This sliding is referred to as hydroplaning, and it results in the vehicles wheels losing frictional engagement with the roadway surface thereby preventing the driver to properly steer the vehicle, and often losing complete control of the vehicle. Thus, every year tens of thousands of automotive vehicle collisions and accidents occur, damaging and destroying thousands of vehicles and, more significantly, injuring, maiming and killing tens of thousands of individuals. In addition, debris on the roadway, ranging from chunks of broken road, shredded tractor trailer tires, branches, cardboard, etc., causes numerous accidents from the vehicle driver either hitting the debris or swerving to avoid the debris. Thus it is desirable to provide vehicle owners with systems or devices that allow the driver to avoid, or at least minimize, the various hazards he or she faces when driving on debris strewn, ice and snow covered roadways.

The prior art discloses a number of systems and devices for heating and melting snow and ice from the wheels, wheel wells, or area adjacent the vehicle wheels.

For example, the Makinson patent (U.S. Pat. No. 4,063,606) discloses an anti-hydroplaning device that includes a blower driven by the engine and to which a pair of hoses are connected, with the nozzles of the hoses adjacent the front of each front tire for discharging high velocity air streams immediately ahead of the vehicle tires.

The Ricci patent (U.S. Pat. No. 4,203,423) discloses a vehicle safety system that includes a tubular-shaped body having an internal valve, and which connected to the vehicle exhaust system, and four conduits extending from the body so that exhaust gases can be discharged from the conduit to the front and rear tread surfaces of the vehicle driving wheels.

The Schittino et al. patent (U.S. Pat. No. 4,324,307) discloses a snow/ice melter that includes a y-shaped stub pipe that is interconnected to the vehicle exhaust pipe by a flexible, detachable u-shaped tube connection wherein the stub pipe has flexible tubes that diverge therefrom for mounting adjacent the vehicle wheels so that hot exhaust gases can be discharged onto the traction surfaces adjacent the vehicle drive wheels.

The Ahmed patent (U.S. Pat. No. 4,848,510) discloses a vehicle snow and ice melting system that includes a blower unit interconnected to the vehicle exhaust pipe and from which conduits extend for directing hot exhaust gases to the areas proximate the vehicle drive wheels.

The Roach patent (U.S. Pat. No. 6,021,843) discloses a snow melting apparatus for wheel wells that includes tubing extending from the vehicle radiator and which is controlled by a valve that connects to a line-splitter which branches into two feeder lines that are mounted to the wheels so that warm water can be circulated therethrough, and from the feeder lines are return lines that connect to the radiator for forming a closed heating system.

The Donastorg patent (U.S. Pat. No. 6,488,217 B1) discloses an anti-hydroplaning system for vehicles that includes blower assemblies disposed adjacent the vehicle tires and which is connected to an air compressor unit, a heater/reservoir tank, and a compressed air storage tank for supplying the blower assemblies with a pressurized stream of mixed and heated air and liquid for melting snow and ice adjacent the vehicle tires.

Nonetheless, despite the ingenuity of the above devices, there remains a need for a device for melting snow and ice from the roadway and which can be mounted on new vehicles or sold as an after-market additional safety feature.

SUMMARY OF THE INVENTION

The present invention comprehends an automotive safety device, commonly referred to as a life-saving car skid inhibitor system, for installation on a new automotive vehicle or for installation as an additional after market safety feature for vehicles already in use. The automotive safety device is an easy to install system for heating and melting ice and snow on the roadway for increasing vehicle safety, and also for blowing away debris that could by collision or accident inducing as the vehicle is traveling upon the roadway.

The automotive safety device includes a heater mounted to the vehicle body adjacent the vehicle engine. The heater includes a blower/compressor and extending from the heater to both the front and the rear of the vehicle is ductwork. The ductwork can be secured to the interior chassis of the vehicle. The ductwork terminates with a front v-shaped diverter duct and a rear v-shaped diverter duct, with both the front and rear v-shaped ducts mounted between, respectively, the front and rear vehicle wheels. Each v-shaped duct terminates with a pair of heating vents for discharging or dispersing heated air onto the roadway and about the vehicle tire thus melting the ice and snow and blowing away potentially dangerous, accident-causing debris. In addition to the heater and ductwork assembly, a heating grid can be mounted to the vehicle undercarriage for generating radiant heat, produced by the vehicle battery, and directing the heat downward thereby providing an even heating of the ice and snow beneath the vehicle. Both the heater/ductwork assembly and the heating grid can be manually operated from a dashboard-mounted control panel that is electrically interconnected with the vehicle's battery. A sensor can also automatically activate the heater and heating grid when a predetermined temperature is reached.

It is an objective of the present invention to provide an automotive safety device for melting ice and snow that can be installed on new vehicles or be retrofitted as an after market safety feature for vehicles presently in use.

It is another objective of the present invention to provide an automotive safety device for melting ice and snow that can be activated manually or automatically through a sensor system.

It is still yet another objective of the present invention to provide an automotive safety device for melting ice and snow that clears the roadway of dangerous ice and snow that has accumulated thereon.

It is still yet a further objective of the present invention to provide an automotive safety device for melting ice and snow that decreases the likelihood of weather-related automotive collisions and accidents.

Still yet a further objective of the present is to provide an automotive safety device for melting ice and snow that provides for an even heating of underside of the automotive vehicle.

Another objective of the present invention is to provide an automotive safety device for melting ice and snow that is capable of clearing debris from the roadway that could damage the vehicle tires or undercarriage.

These and other objects, features and advantages will become apparent to one skilled in the art upon a perusal of the following detailed description read in conjunction with the accompanying drawing figures.

DETAILED DESCRIPTION OF THE PREFERRED EMBODIMENT

Figure 3:
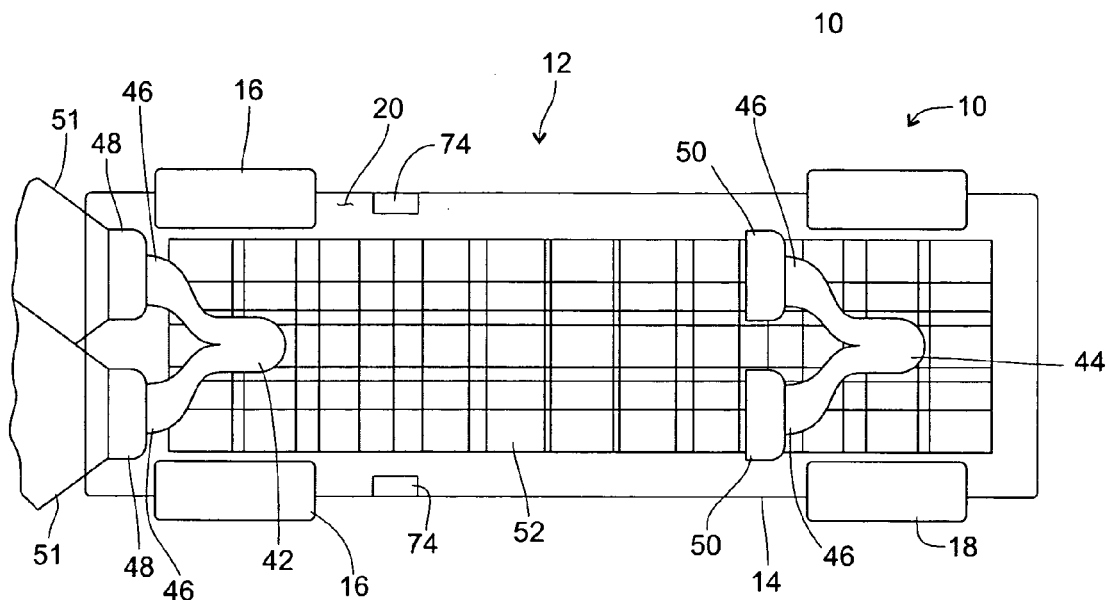
FIG. 3 is a bottom plan view of the automotive safety device illustrating the location of the heating vents and heating grid on the underside of the automotive vehicle.
Figure 4:
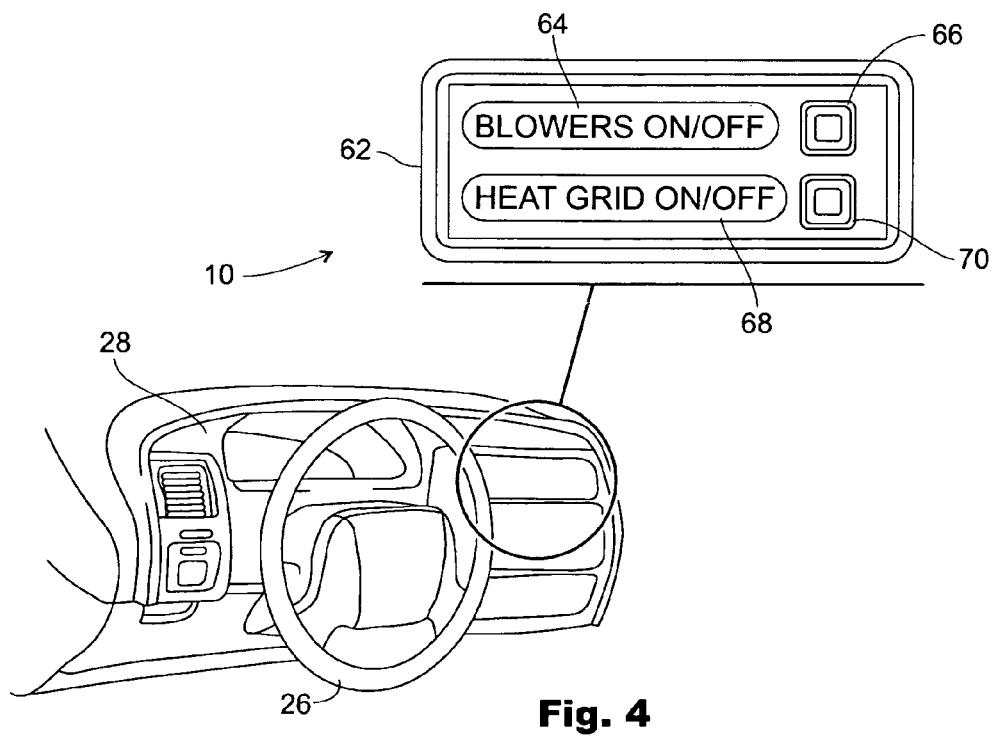
FIG. 4 is a perspective view of the automotive safety device illustrating the dashboard-mounted control panel for manually activating the heating vents and the heating grid.
Figure 5:
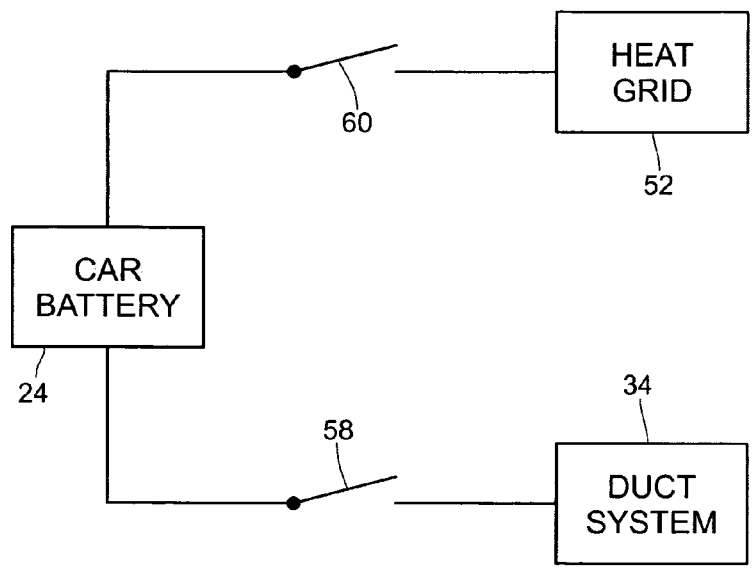
FIG. 5 is a schematic view of the automotive safety device illustrating the electrical interconnection for the heating grid and the duct system that includes the heating vents.

Illustrated in FIGS. 1–8 is an automotive vehicle safety system and device 10 for heating and melting ice and snow that has accumulated on a roadway surface so that the danger of hydroplaning, skidding and involvement in a dangerous and damaging collision or accident is minimized or avoided. The safety system and device 10 can also blow or disperse light debris out of the way that can also cause the swerving and skidding of the vehicle. The automotive vehicle safety system and device 10 can be installed on new vehicles or retrofitted as an after market safety feature on already in use vehicles, such vehicles including cars, trucks, SUVs, minitrucks, and even over-the-road tractor trailers. Illustrated in FIGS. 1, 2, 4, 6 and 7 is a representative automotive vehicle 12 that includes a vehicle body 14, two front vehicle tires 16 and two rear vehicle tires 18, an underside 20, and a vehicle engine area 22. A car battery 24 interconnected to the vehicle engine (not shown) is illustrated in FIG. 5. In addition, the interior or passenger compartment of the vehicle 12 includes a steering wheel 26 projecting from a vehicle dashboard 28. A roadway surface 30 is shown with some light debris 32 distributed thereon.

Figure 6:
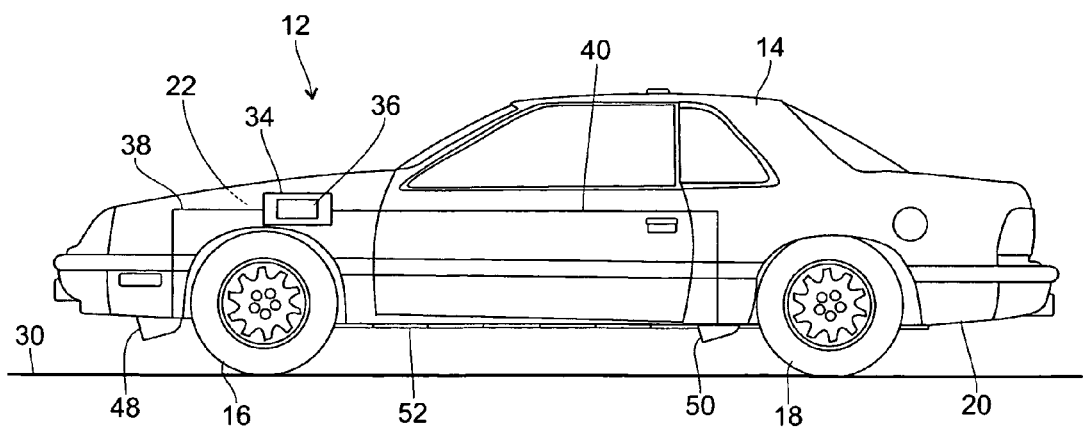
FIG. 6 is a side elevational view of the automotive safety device illustrating in schematic form the disposition of the heater and the ductwork that connects to the individual heating vents.

As shown in FIGS. 3 and 6, the automotive safety device 10 includes a duct system that is electrically interconnected to the car battery 24. Specifically, the duct system includes a heater 34 preferably mounted within the vehicle engine area 22 and adjacent the engine. The heater 34 is electrically interconnected to the car battery 24 for electrical actuation thereby, and the heater 34 includes a standard blower/compressor 36 for drawing in, compressing and heating, and then conveying the heated air therefrom. Extending from the heater 34, and in flow communication therewith, is ductwork; specifically, a front conduit or duct 38 and an opposite rear conduit or duct 40. Both ducts 38 and 40 can be mounted to the chassis or undercarriage of the vehicle 12 at appropriate locations therealong. The front duct 38 connects to a v-shaped front diverter duct 42 and the rear duct 40 connects to a v-shaped rear diverter duct 44. The front diverter duct 42 is mounted to the vehicle underside 20 or chassis and between the vehicle front tires 16, and the rear diverter duct 44 is mounted to the vehicle underside 20 or chassis generally between the vehicle rear tires 18.

As shown in FIGS. 1–3, and 6, both the front and the rear diverter ducts 42 and 44 bifurcate, split or branch off into two intermediate duct lines 46, and each intermediate duct line 46 terminates with a heating vent that is angled slightly downward toward the roadway surface 30. Thus, the front heating vents 48 are located inboard and slightly ahead of each vehicle front tire 16, and the rear heating vents 50 are located inboard and slightly ahead of each vehicle rear tire 18. When the system 10 is operational, a continuous stream of heated air is forcefully dispersed from the heater 34, through the front and rear ducts 38 and 40, through the respective diverter ducts 42 and 44, and then through the front heating vents 48 and rear heating vents 50 spreading out in an approximate heat dispersal region 51 as shown by the rear heating vents 50 of FIG. 2 and the front heating vents 48 of FIG. 3 for heating and melting the ice and snow beneath the vehicle 12.

Figure 1:
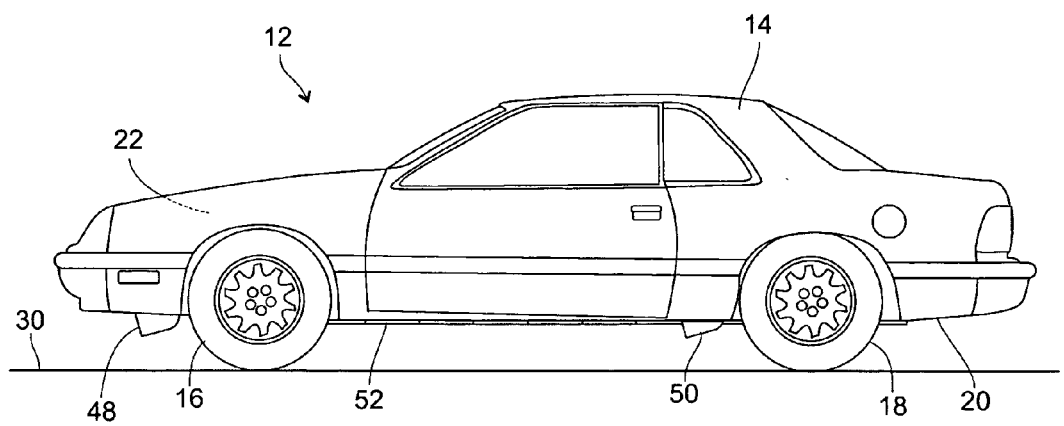
FIG. 1 is a side elevational view of the automotive safety device illustrating it's mounting to an automotive vehicle for melting ice and snow beneath the underside or carriage of the vehicle and adjacent the vehicle tires.
Figure 2:
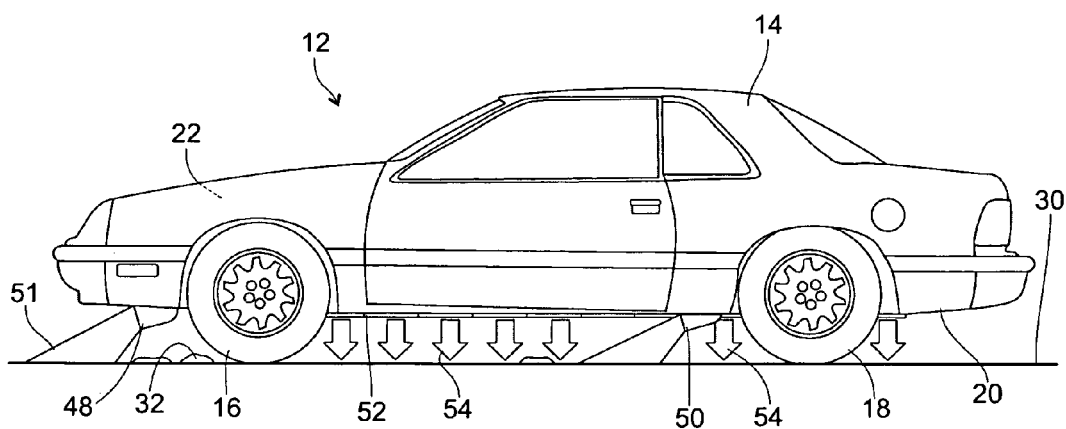
FIG. 2 is a side elevational view of the automotive vehicle shown in FIG. 1 illustrating the direction of heat discharge both from the heating vents and the heating grid for melting ice and snow beneath the vehicle and adjacent the vehicle tires.

For additional ice and snow heating and melting capability a heating grid 52 can be mounted to the underside 20 of the vehicle 12 as shown in FIGS. 1–6. While the heating grid 52 would be electrically interconnected to the car battery 24, the heating grid 52 would be separately activated from the duct system. The heating grid 52 would extend between the front and rear vehicle tires 16 and 18, and when activated would direct radiant heat 54, as shown in FIG. 2, downward onto the roadway surface 20. The heating grid 52 provides for a more even and uniform distribution of radiant heat downwardly upon the roadway surface due to the rectangular and symmetric configuration of the heating grid 52 for heating and melting the ice and snow.

Illustrated in FIG. 5 is a representative electrical schematic 56 showing the electrical interconnection of the heating grid 52 and the duct system—the heater 34—to the car battery 24. The car battery 24 is connected to the duct system by a standard single throw switch 58 and also to the heating grid 52 by a second standard single throw switch 60—the switches 58 and 60 capable of being activated independent of each other. (For representative purposes both switches 58 and 60 are shown in the open disengaged state).

Figure 7:
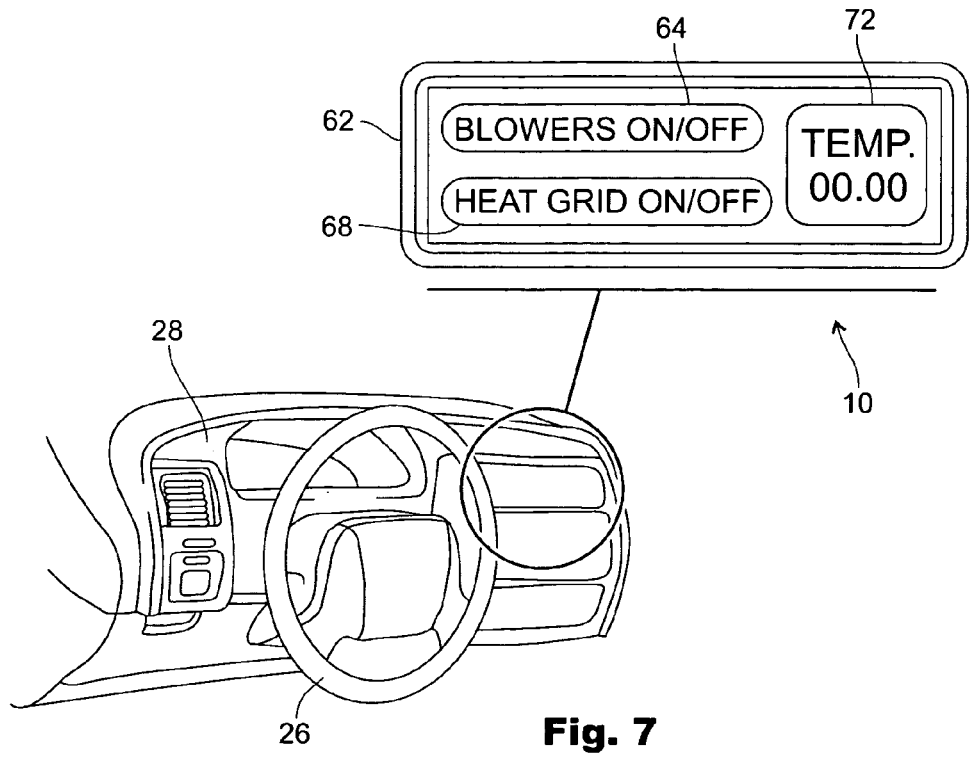
FIG. 7 is a perspective view of the automotive safety device illustrating the dashboard-mounted control panel that also includes a temperature gauge.
Figure 8:
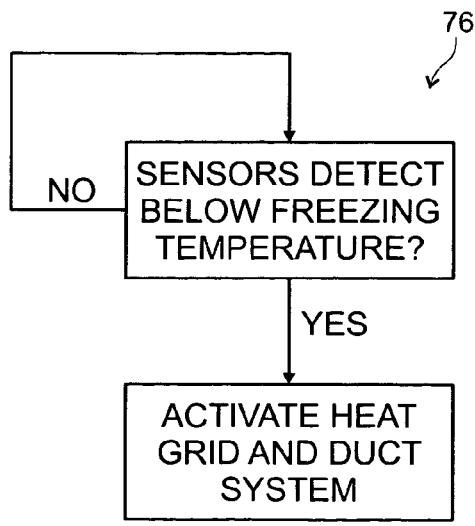
FIG. 8 is a schematic view of the automotive safety device illustrating a general flowchart for sensor detection and automatic activation of the duct system and the heating grids.

Shown in FIGS. 4, 7 and 8, are both manual and automatic control and system activation means for activating the duct system and the heating grid 52. With reference to FIG. 4, the manual activation and control means includes a control panel 62 mounted to the dashboard 28 and adjacent the steering wheel 26. The control panel 62 is electrically interconnected to the vehicle's electrical system—including the battery 24—and the heater 34 in any conventional manner; and the control panel 62 includes a blower (vent) on/off indicator 64 and corresponding on/off button 66 and a heating grid on/off indicator 68 and corresponding on/off button 70. The indicators 64 and 68 can be standard LED lights. In addition, as shown in FIGS. 7 and 8, the automatic system control and activation means includes the control panel 62 and a temperature indicator 72. The temperature indicator 72 can be integrated with one or more sensors 74 mounted on the vehicle 12, such as on the underside 20 of the vehicle 12 as shown in FIG. 3. The sensors 74 will also be electrically interconnected to the control panel 62, the duct system and the heating grid 52 so that upon detection of the attainment of a predetermined temperature, such as below freezing, the system 10 will automatically activate both the heating grid 52 and the heater 34 for both blowing heated air and directing radiant heat 54 against the ice and snow for the heating and melting thereof. FIG. 8 is a representative flowchart 76 illustrating the steps that the automatic activation and control means would employ in sensing the predetermined temperature and then activating the complete automotive safety system 10. Thus, the duct system, including the heater 34 for directing the discharge of heated air through the front heating vents 48 and rear heating vents 50, can either be manually or automatically activated.

While this invention has been described in conjunction with a preferred embodiment, it is obvious that numerous modifications, alterations, and variations may be made by those skilled in the art without departing from the scope and spirit of the invention as defined by the claims appended hereto.

What is claimed is:

1. An automotive safety device for a vehicle having a pair of front tires and a pair of rear tires, an underside, a passenger compartment including a dashboard, and an engine electrically connected to a battery, the automotive safety device, comprising:
    a heater mounted adjacent to the engine and in electrical connection with the battery for selectively generating heated air;
    a front duct extending from the heater toward the front tires;
    a rear duct extending from the heater toward the rear tires;
    a v-shaped front diverter duct attached to the front duct and extending in between the front tires;
    a v-shaped rear diverter duct attached to the rear duct and extending between the rear tires;
    a pair of downwardly angled front heating vents that bifurcate from, and are in flow communication with, the v-shaped front diverter duct;
    a pair of downwardly angled rear heating vents that bifurcate from, and are in flow communication with, the v-shaped rear diverter duct;
    a heating grid mounted to the underside of the vehicle and between the front and rear tires, the heating grid electrically interconnected to the battery for generating radiant heat that is downwardly directed;
    a control panel located within the passenger compartment and electrically connected to the heater for the selective activation of the heater to produce heated air and for selective activation of the heating grid; and
    the activation of the heater and the heating grid from the control panel causing the heater to produce heated air that is conveyed through the front and rear ducts and then through the front and rear diverter ducts for dispersal through the front and rear heating vents for heating and melting ice and snow on the roadway surface upon which the vehicle is traveling concomitant with the even downward production and distribution of radiant heat from the heating grid that also heats and melts ice and snow on the roadway surface.

2. The automotive safety device of claim 1 wherein the control panel includes a blower on/off indicator light and a corresponding blower on/off button that are both electrically interconnected to the battery and the heater.

3. The automotive safety device of claim 2 wherein the control panel includes a heating grid on/off indicator light and a corresponding heating grid on/off button that are electrically interconnected to the battery and the heating grid.

4. The automotive safety device of claim 3 wherein the control panel includes a temperature indicator electrically interconnected to the battery, the heater and the heating grid.

5. The automotive safety device of claim 4 further comprising at least one sensor mounted to the vehicle and in electrical interconnection with the temperature indicator and the control panel for sensing the attainment of a predetermined temperature level whereupon the heater and the heating grid are automatically activated.

6. An automotive vehicle safety device for an automotive vehicle having at least one pair of front and at least one pair of rear tires, an underside, a passenger compartment including a dashboard, and an engine electrically connected to a battery, the automotive vehicle safety system, comprising:
    a heater mounted adjacent to the engine and in electrical connection with the battery for selectively generating heated air;
    a front duct extending from the heater toward the front tires;
    a rear duct extending from the heater toward the rear tires;
    a v-shaped front diverter duct attached to the front duct and extending in between the front tires;
    a v-shaped rear diverter duct attached to the rear duct and extending between the rear tires;
    a pair of downwardly angled front heating vents that bifurcate from, and are in flow communication with, the v-shaped front diverter duct;
    a pair of downwardly angled rear heating vents that bifurcate from, and are in flow communication with, the v-shaped rear diverter duct;
    a control panel located within the passenger compartment and electrically interconnected to the heater for selectively activating the heater to produce heater air; and
    the activation of the heater from the control panel causing the heater to produce heated air that is conveyed through the front and rear ducts and then through the front and rear diverter ducts for dispersal through the front and rear heating vents for heating and melting ice and snow on the roadway surface upon which the automotive vehicle is traveling.

7. The automotive vehicle safety system of claim 6 further comprising a heating grid that is mounted to the underside of the automotive vehicle and between the front and rear tires and which is electrically interconnected to the battery for generating radiant heat that is downwardly and evenly distributed for heating and melting ice and snow on the roadway surface.

8. The automotive vehicle safety device of claim 7 wherein the control panel includes a blower on/off indicator light and corresponding blower on/off button that are electrically interconnected to the battery and the heater.

9. The automotive vehicle safety device of claim 8 wherein the control panel includes a heating grid on/off indicator light and corresponding heating grid on/off button that are electrically interconnected to the battery and the heating grid.

10. The automotive vehicle safety device of claim 9 wherein the control panel includes a temperature indicator electrically interconnected to the battery, the heater and the heating grid.

11. The automotive vehicle safety device of claim 10 further comprising at least one sensor mounted to the vehicle and in electrical interconnection with the temperature indicator and the control panel for sensing the attainment of a predetermined temperature level whereupon the heater and the heating grid are automatically activated.

* * * * *